(12) United States Patent
Kostarnov et al.

(10) Patent No.: US 8,352,532 B1
(45) Date of Patent: Jan. 8, 2013

(54) CIRCUIT STRUCTURE FOR MULTIPLYING NUMBERS USING LOOK-UP TABLES AND ADDERS

(75) Inventors: Igor Kostarnov, Tokyo (JP); Andrew Whyte, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 811 days.

(21) Appl. No.: 12/544,441

(22) Filed: Aug. 20, 2009

(51) Int. Cl.
*G06F 7/52* (2006.01)
(52) U.S. Cl. ........................................ 708/625; 708/628
(58) Field of Classification Search .................. 708/625, 708/626, 628
See application file for complete search history.

(56) References Cited

U.S. PATENT DOCUMENTS

| | | | | |
|---|---|---|---|---|
| 4,566,075 A | * | 1/1986 | Guttag | 708/620 |
| 5,724,276 A | * | 3/1998 | Rose et al. | 708/235 |
| 6,904,442 B1 | * | 6/2005 | Moore et al. | 708/235 |
| 7,356,554 B1 | * | 4/2008 | Hazanchuk et al. | 708/625 |

OTHER PUBLICATIONS

XILINX, Inc., *Virtex-5 FPGA XtremeDSP Design Considerations User Guide*, Jan. 12, 2009, Chapter 2, pp. 49-57, UG193 (v3.3)., Xilinx, Inc., San Jose, California, USA.

* cited by examiner

*Primary Examiner* — Chuong D Ngo

(57) ABSTRACT

A circuit structure efficiently multiplies a first and second number. The circuit structure includes multipliers for the pairs of three-bit digits of the first number and three-bit digits of the second number. The multipliers produce six-bit partial products from the pair of three-bit digits of the first and second numbers. Each multiplier includes look-up tables receiving the pair of three-bit digits of the first and second numbers. A summing-tree circuit includes adders arranged in a series of levels, the adders in an initial one of the levels producing partial sums from the six-bit partial products from the multipliers, and for each first and successive second ones of the levels in the series, the adders in the second level producing another plurality of partial sums from the partial sums from the first level. A last one of the levels includes the adder that produces a product of the first and second numbers.

20 Claims, 6 Drawing Sheets

CIRCUIT STRUCTURE FOR MULTIPLYING NUMBERS USING LOOK-UP TABLES AND ADDERS

FIELD OF THE INVENTION

The present invention generally relates to arithmetic logic of data processing systems, and more particularly to digital multiplication.

BACKGROUND

Multiplication throughput is often the performance limiter for many applications in digital signal processing (DSP), such as video processing. The performance objectives of certain applications cannot be achieved with general-purpose DSP processors. These applications require special-purpose circuitry to achieve the performance objectives. Designing this special-purpose circuitry can be time consuming and difficult. Therefore, there is a general need for fast multiplication circuits for DSP applications.

The present invention may address one or more of the above issues.

SUMMARY

Various embodiments of the invention provide a circuit structure for multiplying a first number and second number. The first and second numbers have multiple three-bit digits. The circuit structure includes multipliers for the pairs of the three-bit digits of the first number and the three-bit digits of the second number. The multipliers produce six-bit partial products, with each multiplier producing its six-bit partial product from the pair of three-bit digits of the first and second numbers. Each multiplier includes look-up tables, with a six-bit input of each of the look-up tables receiving the pair of three-bit digits of the first and second numbers for the multiplier, and a one-bit output of each of the look-up tables producing a bit of the six-bit partial product for the multiplier. The circuit structure also includes a summing-tree circuit including adders arranged in a series of levels, the adders in an initial one of the levels producing partial sums from the six-bit partial products from the multipliers, and for each first and successive second ones of the levels in the series, the adders in the second level producing another plurality of partial sums from the partial sums from the first level. A last one of the levels includes the adder that produces a final product of the first and second numbers.

Various other embodiments of the invention provide a circuit structure for multiplying a first nine-bit number by a second nine-bit number. The first and second nine-bit numbers each have three three-bit digits. The circuit structure includes nine multipliers for the pairs of the three-bit digits of the first nine-bit number and the three-bit digits of the second nine-bit number. The multipliers produce six-bit partial products, with each multiplier producing its six-bit partial product from the pair of three-bit digits of the first and second nine-bit numbers. Each multiplier includes look-up tables, with a six-bit input of each of the look-up tables receiving the pair of the three-bit digits of the first and second nine-bit numbers for the multiplier, and a one-bit output of each of the look-up tables of the multiplier providing a bit of the six-bit partial product for the multiplier. For a first, second, and third group respectively corresponding to a low, middle, and high one of the three three-bit digits of the second nine-bit number, each of the groups includes the six-bit partial products for the pairs of each of the three three-bit digits of the first nine-bit number and the corresponding three-bit digit of the second nine-bit number. A concatenation circuit provides a partial result concatenating an inferior three-bit digit of each six-bit partial product in the first group and a superior three-bit digit of each six-bit partial product in the third group. A first adder provides a first partial sum of a superior three-bit digit of each six-bit partial product in the first group and an inferior three-bit digit of each six-bit partial product in the second group. A second adder provides a second partial sum of a superior three-bit digit of each six-bit partial product in the second group and an inferior three-bit digit of each six-bit partial product in the third group. A third adder provides a final product adding the partial result and the first and second partial sums.

Yet another embodiment of the invention provides a circuit structure for multiplying a first nine-bit number and a second nine-bit number. The first and second nine-bit numbers each have three three-bit digits. The circuit structure includes nine multipliers for the pairs of the three-bit digits of the first nine-bit number and the three-bit digits of the second nine-bit number. The multipliers produce six-bit partial products, with each multiplier producing its six-bit partial product from the pair of three-bit digits of the first and second nine-bit numbers. Each multiplier includes look-up tables, with a six-bit input of each of the look-up tables receiving the pair of the three-bit digits of the first and second nine-bit numbers for the multiplier, and a one-bit output of each of the look-up tables of the multiplier providing a bit of the six-bit partial product for the multiplier. For a first, second, and third group respectively corresponding to a low, middle, and high one of the three three-bit digits of the second nine-bit number, each of the groups includes the six-bit partial products for the pairs of each of the three three-bit digits of the first nine-bit number and the corresponding three-bit digit of the second nine-bit number. A concatenation provides a partial result concatenating an inferior three-bit digit of each six-bit partial product in the first group and a superior three-bit digit of each six-bit partial product in the third group. A first adder provides a partial sum of an inferior three-bit digit of each six-bit partial product in the second group, a superior three-bit digit of each six-bit partial product in the second group, and an inferior three-bit digit of each six-bit partial product in the third group. A second adder provides a final product adding a superior three-bit digit of each six-bit partial product in the first group, the partial result, and the partial sum.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

Figure 1:
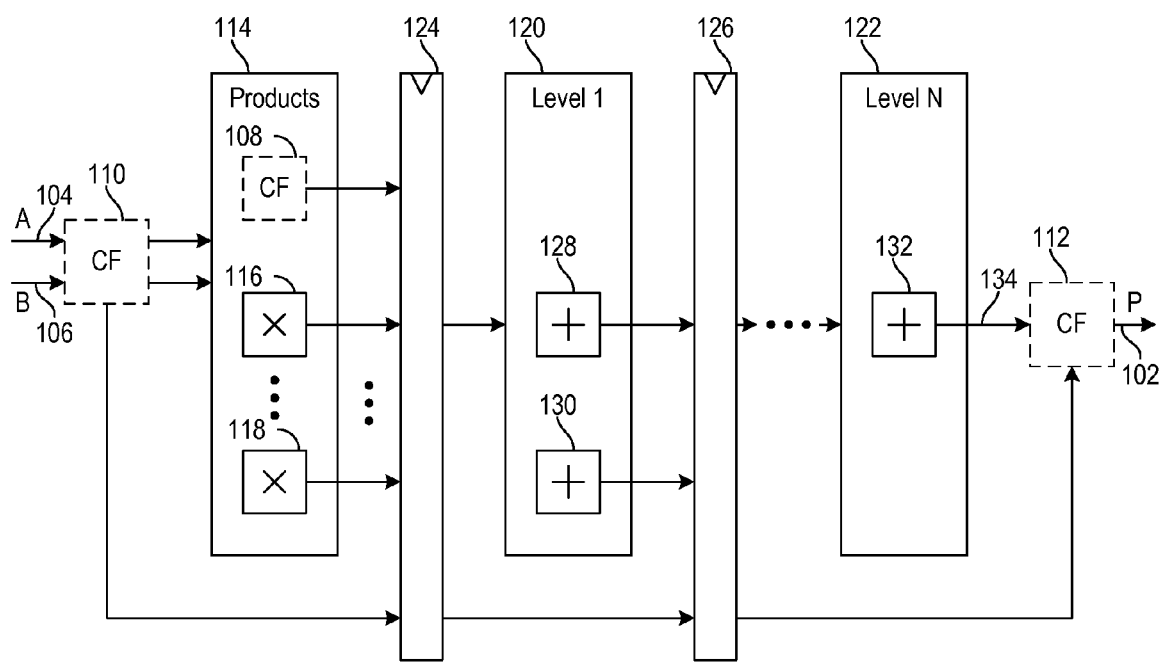
FIG. 1 is a block diagram of an example circuit for multiplying two numbers in accordance with various embodiments of the invention.

FIG. 1 is a block diagram of an example circuit or circuit structure for multiplying two numbers in accordance with various embodiments of the invention. The circuit produces a product on line 102 of two numbers on lines 104 and 106. In one embodiment, the optional correction circuits 108, 110, and 112 permit one or both of the multiplied numbers on lines 104 or 106 to be signed numbers in two's complement representation or another representation of signed numbers.

In one embodiment, the input numbers on lines 104 and 106 are unsigned binary numbers and the circuit omits all the correction circuits 108, 110, and 112. Each input number on lines 104 and 106 is grouped into three-bit digits, and partial products block 114 includes multipliers 116 through 118 for all pairs of a three-bit digit from each of the input numbers on lines 104 and 106. Each multiplier 116 through 118 is a lookup table receiving a three-bit digit of the number on line 104 and a three-bit digit of the number on line 106, and outputting the product of this pair of three-bit digits. An adder tree sums the partial products. The adder tree includes a series of levels 120 through 122. The last level 122 of the adder tree outputs on line 102 the final product of the unsigned binary numbers on lines 104 and 106.

In another embodiment, the input numbers on lines 104 and 106 are both signed binary numbers, and optional correction circuit 108 is omitted and optional correction circuits 110 and 112 are included to compensate for the representation of the signed numbers. In one example, the input numbers on lines 104 and 106 are signed binary numbers in sign and magnitude representation, and correction circuit 110 separates the sign and magnitude of each number on lines 104 and 106 and transfers the signs to the correction circuit 112 and transfers the magnitudes as unsigned binary numbers to the partial products block 114. The correction circuit 112 converts these signs into the final sign and combines the final sign and the magnitude from the adder tree to produce the final product on line 102.

In another example of the embodiment with both the input numbers on lines 104 and 106 being signed binary numbers, the input numbers on lines 104 and 106 are signed binary numbers in two's complement representation, and optional correction circuit 108 is omitted and optional correction circuits 110 and 112 are included to compensate for the two's complement representation. Correction circuit 110 extracts the sign of the input numbers on lines 104 and 106 and converts the input numbers on lines 104 and 106 into positive binary numbers. Correction circuit 110 converts a negative number on lines 104 or 106 into a positive number by generating the two's complement of the negative number. Correction circuit 112 produces the final product on line 102 by passing the result from the adder tree when the extracted signs are both positive or both negative, and generating the two's complement of the result from the adder tree when one extracted sign is positive and the other is negative.

In yet another example of the embodiment with both the input numbers on lines 104 and 106 being signed binary numbers, the input numbers on lines 104 and 106 are again signed binary numbers in two's complement representation, but the optional correction circuit 108 is included and optional correction circuits 110 and 112 are omitted. The optional correction circuit 108 generates a correction value that compensates for the two's complement representation when the adder tree adds the correction value together with the partial products generated from the input numbers on lines 104 and 106. If both input numbers on lines 104 and 106 are positive, then the needed correction value is zero. If the input numbers on lines 104 and 106 are a negative n-bit number with magnitude A and a positive n-bit number with magnitude B, then as unsigned numbers the negative number represents $2^n - A$ and the positive number represents B. The correction value is to subtract $B \times 2^n$ because the adder tree without the correction value generates $(2^n - A)B = B \times 2^n - A \times B$ while the desired result is $2^{2n} - A \times B$ (the carryout of $2^{2n}$ is dropped because the final product on line 102 is a 2n-bit number). If both input numbers on lines 104 and 106 are negative, the correction value is to subtract $[(2^n - A) + (2^n - B)]2^n$ because the adder tree without the correction value generates $(2^n - A)(2^n - B) = -2^{2n} + [(2^n - A) + (2^n - B)]2^n + A \times B$ while the desired result is $A \times B$ (again the carryout of $-2^{2n}$ is dropped).

In yet another embodiment, the input number on line 104 is a signed number in two's complement representation and the input number on line 106 is an unsigned binary number, and the optional correction circuit 108 is included and optional correction circuits 110 and 112 are omitted. If the signed number on line 104 is positive, then the needed correction value is zero. If the signed number on line 104 is a negative n-bit number with magnitude A and the unsigned binary number on line 106 has magnitude B, then the correction value is to subtract $B \times 2^n$ in the adder tree.

It will be appreciated that the above examples for the correction circuits 108, 110, and 112 are illustrative of various correction circuits for modifying an unsigned multiplication circuit to compensate for one or more signed inputs. Another illustrative example of a correction circuit 308 is discussed below in connection with FIG. 3.

In certain embodiments, pipelining registers are added within the multiplication circuit to increase the throughput of the multiplication circuit. In one embodiment, respective registers 124 through 126 are added before each level 120 through 122 of the adder tree. The register 124 before the first level 120 stores the partial products from the multipliers 116 through 118 and the correction value from the optional correction circuit 108 of the partial products block 114. Register 124 provides the stored partial products and the correction value to the adders 128 and 130 in the first level 120 of the adder tree. Register 126 before the last level 122 of the adder tree stores the partial sums from the adders 128 and 130 in the prior level 120 of the adder tree. Register 126 provides the stored partial sums to the final adder 132 in the last level 122 of the adder tree. Adder 132 in the last level 122 of the adder tree produces the product output on line 102 after possible modification by the optional correction circuit 112.

It will be appreciated that the multiplier circuit includes more or fewer pipelining registers in other embodiments. In one example, the multiplier circuit includes a pipelining register before every other one of the levels 120 through 122 of the adder tree. In another example, pipelining registers are included within the adders 128, 130, and 132 to split the operation of the carry chain of each adder across clock cycles. In yet another example, the multiplier circuit includes extra pipelining stages for performing the correction calculations of correction circuits 108, 110, and/or 112.

The adder tree includes a series of levels 120 through 122. The first level 120 produces a number of partial sums that is less than a number of the partial products from block 114. Each level 120 through 122 produces a number of partial sums that is less than a number of the inputs to the level, until the last level 122 produces a single partial sum on line 134. In one embodiment, a majority of the adders 128, 130, and 132 in the adder tree are three-input adders that each add three inputs to reduce these three inputs to a single binary number, and any remaining adders are two-input adders that each add two inputs to reduce these two inputs to a single binary number. Because three-input adders more efficiently reduce the number of partial sums to be added in later levels of the adder tree, the number of levels 120 through 122 is reduced by an adder tree that includes mostly three-input adders.

Figure 2:
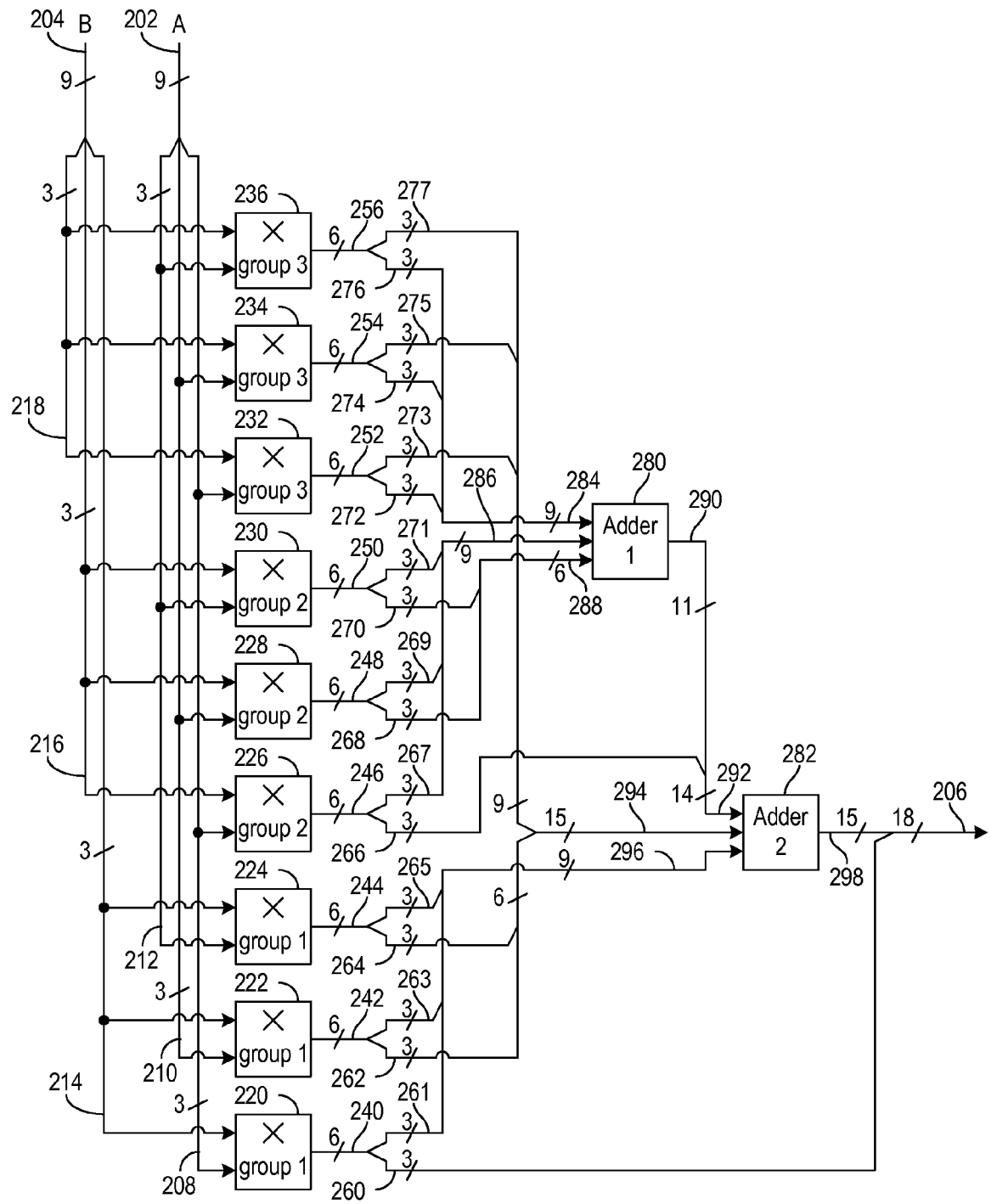
FIG. 2 is a block diagram of an example circuit for multiplying two unsigned nine bit numbers in accordance with various embodiments of the invention.

FIG. 2 is a block diagram of an example circuit for multiplying two unsigned nine-bit numbers on lines 202 and 204 in accordance with various embodiments of the invention. The final product on line 206 is the eighteen-bit product of the nine-bit numbers on lines 202 and 204.

The nine-bit input number on line 202 is split into three three-bit digits on lines 208, 210, and 212; and the nine-bit input number on line 204 is split into three three-bit digits on lines 214, 216, and 218. The digits on lines 208, 210, and 212 are respectively the low, middle, and high digit of the input number on line 202; and the digits on lines 214, 216, and 218 are respectively the low, middle, and high digit of the input number on line 204.

Nine multipliers 220, 222, 224, 226, 228, 230, 232, 234, and 236 receive pairs of one of the three-bit digits on lines 208, 210, and 212, and one of the three-bit digits on lines 214, 216, and 218. The multipliers 220, 222, and 224 form a first group because they receive the low digit on line 214 from the nine-bit input number on line 204. Similarly, the multipliers 226, 228, and 230 form a second group for the middle digit on line 216; and the multipliers 232, 234, and 236 form a third group for the high digit on line 218. The multipliers 220, 226, and 232 also receive the low digit on line 208 of the nine-bit number on line 202. Similarly, the multipliers 222, 228, and 234 also receive the middle digit on line 210, and the multipliers 224, 230, and 236 also receive the high digit on line 212.

Multipliers 220, 222, 224, 226, 228, 230, 232, 234, and 236 respectively produce six-bit partial products on lines 240, 242, 244, 246, 248, 250, 252, 254, and 256. The multipliers include lookup tables for generating the six-bit partial products. In one embodiment, each of the multipliers 220, 222, 224, 226, 228, 230, 232, 234, and 236 includes six lookup tables generating respective bits of the corresponding six-bit partial product. Each of the six lookup tables in each multiplier has a six-bit input receiving the two three-bit digits being multiplied by the multiplier, except that the lookup table generating the least significant bit of the six-bit partial product requires only a two-bit input receiving the least significant bit of each three-bit digit being multiplied, and the lookup table generating the second least significant bit of the six-bit partial product requires only a four-bit input receiving the least significant two bits of each three-bit digit being multiplied. In another embodiment, a two-input AND gate generates the least significant bit of each six-bit partial product and lookup tables generate the other bits of each six-bit partial product.

The six-bit partial product on line 240 is split into an inferior (less significant) three bits on line 260 and a superior (more significant) three bits on line 261. Similarly, the six-bit partial products on lines 242, 244, 246, 248, 250, 252, 254, and 256 are split into the inferior three bits on respective lines 262, 264, 266, 268, 270, 272, 274, and 276; and the superior three bits on respective lines 263, 265, 267, 269, 271, 273, 275, and 277.

The adder 280 is a first level of an adder tree including adders 280 and 282. Adder 280 adds three binary numbers on lines 284, 286, and 288. The binary number on line 284 has nine bits including the inferior three bits on lines 272, 274, and 276 of each of the six-bit partial products from the multipliers in group three, and the binary number on line 286 has nine bits including the superior three bits on lines 267, 269, and 271 of each of the six-bit partial products from the multipliers in group two. The binary number on line 288 includes the inferior three bits of each of the six-bit partial products from the multipliers in group two, except that the inferior three bits on line 266 bypasses adder 280 because none of lines 267, 268, 269, 270, 271, 272, 274, and 276 have bits with the same degree of significance. Even though inferior three bits on line 266 bypass adder 280 in this embodiment, adder 280 effectively adds the inferior three bits on lines 266, 268, 270 of each of the six-bit partial products from the multipliers in group three, and superior and inferior three bits of each of the six-bit partial products from the multipliers in group two.

Adder 280 produces an eleven-bit scaled binary number on line 290 by adding the scaled binary numbers on lines 284, 286, and 288. Even though the scaled binary number on line 288 has six bits while the scaled binary numbers on lines 284 and 286 have nine bits, the scaled binary numbers on lines 284, 286, and 288 are all shifted in significance by six bits or a scaling factor of sixty-four. Thus, scaled binary number on line 290 is also shifted in significance by six bits or a scaling factor of sixty-four. Therefore, the smallest non-zero number represented on line 290 is sixty-four. The number of bits on line 290 is eleven bits because there are potentially two carryout bits. The eleven-bit scaled binary number on line 290 and the three bits on line 266 are concatenated to form a fourteen-bit scaled binary number on line 292 that is shifted in significance by three bits or a factor of eight.

Because there is no overlap in significance between the superior three bits on lines 273, 275, and 277 of each of the six-bit partial products from the multipliers in group three and the inferior three bits on line 260, 262, and 264 of each of the six-bit partial products from the multipliers in group one, a concatenation circuit effectively adds these bits together by simply concatenating these bits. This concatenation reduces the number of hardware adders needed in the adder tree. In addition, the least significant three bits on line 260 of the six-bit partial product on line 240 from multiplier 220 are the only bits at the least significant level in the six-bit partial products on lines 240, 242, 244, 246, 248, 250, 252, 254, and 256. Thus, these three bits on line 260 bypass the concatenation circuit and adder 282 in this embodiment. Even though these three bits on line 260 bypass the concatenation circuit and adder 282, the concatenation circuit effectively includes these three bits on line 260 and the adder 282 effectively adds these three bits on line 260. With the bypass of the three bits on line 260, the concatenation circuit creates a fifteen-bit scaled binary number on line 294 that is shifted in significance by three bits or a factor of eight.

Adder 282 adds the scaled binary numbers on lines 292, 294, and 296. The scaled binary number on line 296 includes the superior three bits on lines 261, 263, and 265 of each of the six-bit partial products from the multipliers in group one. Even though these scaled binary numbers on lines 292, 294, and 296 have different numbers of bits, they are all shifted in significance by the same scaling factor of eight. In one embodiment, the implementation of adder 282 is simplified at the more significant bits because the number of inputs having these more significant bits is reduced from three to two or one. Adder 282 produces the more significant fifteen bits of the final product on line 298. The fifteen bits on line 298 are concatenated with the least significant three bits on line 260 to form the final product on line 206.

Figure 3:
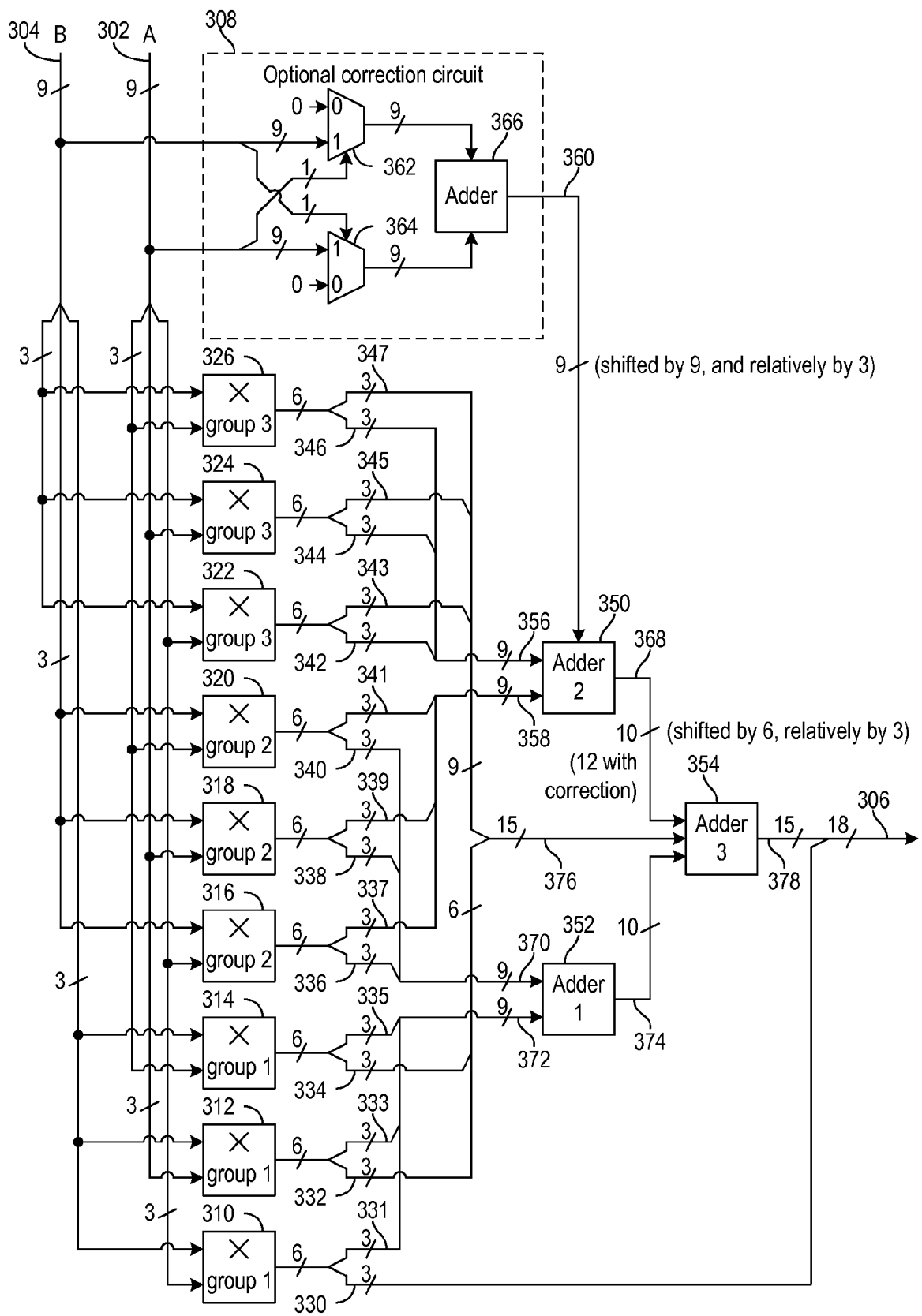
FIG. 3 is a block diagram of an example circuit for multiplying two signed or unsigned nine-bit numbers in accordance with various embodiments of the invention.

FIG. 3 is a block diagram of an example circuit for multiplying two signed or unsigned nine-bit numbers on lines 302 and 304 in accordance with various embodiments of the invention. The nine-bit numbers on lines 302 and 304 are multiplied to create a final product on line 306. FIG. 3 illustrates multiplication of signed binary numbers in two's complement representation by including optional correction circuit 308, and multiplication of unsigned binary numbers by omitting the optional correction circuit 308.

The operation of the multipliers 310, 312, 314, 316, 318, 320, 322, 324, and 326 corresponds with the operation of the multipliers 220, 222, 224, 226, 228, 230, 232, 234, and 236 in FIG. 2. However, FIG. 3 adds up the partial products with a different adder tree to accommodate also adding a correction value from correction circuit 308.

Multiplier 310 generates a six-bit partial product having an inferior three bits on line 330 and a superior three bits on line 331. Multipliers 312, 314, 316, 318, 320, 322, 324, and 326 similarly generate six-bit partial products having respective inferior and superior three bits of 332 and 333, 334 and 335, 336 and 337, 338 and 339, 340 and 341, 342 and 343, 344 and 345, and 346 and 347.

The adder tree includes adders 350, 352, and 354. Adder 350 adds the nine bits on line 356 and the nine bits on line 358. The nine bits on line 356 include the inferior three bits on lines 342, 344, and 346 of the six-bit partial product from each of the multipliers 322, 324, and 326 in group three, and the nine bits on line 358 include the superior three bits on lines 337, 339, and 341 of the six-bit partial products from each of the multipliers 316, 318, and 320 in group two. In one embodiment, adder 350 is a three-input adder that also subtracts a correction value on line 360 from optional correction circuit 308. In another embodiment, correction circuit 308 generates the two's complement of the correction value shown on line 360 and adder 350 is a three-input adder that adds the nine bits on line 356, the nine bits on line 358, and the two's complement of the correction value. In yet another embodiment, adder 350 is a two-input adder.

The optional correction circuit 308 includes multiplexers 362 and 364. Multiplexer 362 selects the nine-bit input on line 304 when the nine-bit input on line 302 is negative, and multiplexer 364 selects the nine-bit input on line 302 when the nine-bit input on line 304 is negative. Otherwise, multiplexers 362 and 364 select a value of zero. Adder 366 of correction circuit 308 produces the correction value on line 360 by adding the values selected by multiplexers 362 and 364. Thus, when the nine-bit numbers on lines 302 and 304 are both positive, negative and positive, positive and negative, and both negative, then the correction value on line 360 is respectively zero, the value of the positive nine-bit number on line 304, the value of the positive nine-bit number on line 302, and the sum of the values of the negative nine-bit numbers on lines 302 and 304, or respectively zero, the value B on line 304, the value A on line 302, and the value $(2^n-A)+(2^n-B)$.

This correction value on line 360 compensates for the input numbers on lines 302 and 304 being signed numbers in two's complement representation. The correction value on line 360 converts the final product on line 306 from the value that would be correct for unsigned inputs on lines 302 and 304 to the final product on line 306 that is correct for the signed inputs on lines 302 and 304.

The correction value on line 360 is a scaled binary number that is shifted in significance by nine bits because the input values on lines 302 and 304 have nine bits. The adder 350 is a three-input adder that adds together the scaled binary numbers on lines 356 and 358, and also subtracts the scaled binary number on line 360. However, the scaled binary numbers on lines 356 and 358 are shifted in significance by six bits and the correction value on line 360 is shifted in significance by nine bits. Thus, the correction value on line 360 is shifted in significance by three bits relative to the binary numbers on lines 356 and 358, and the adder 350 is only a two-input adder for the least significant three bits in one embodiment.

Adder 350 produces a twelve-bit scaled binary number on line 368 that is shifted in significance by six bits or a scaling factor of sixty-four. Thirteen bits are not needed for the scaled binary number on line 368 because the final product on line 306 is not affected by any carryout of adder 350. If the correction circuit 308 is omitted, adder 350 instead produces a ten-bit binary number to accommodate a possible carryout from adding the nine-bit binary numbers on lines 356 and 358.

Adder 352 is a two-input adder that adds the nine bits on line 370 and the nine bits on line 372. The nine bits on line 370 include the inferior three bits on lines 336, 338, and 340 of the six-bit partial products from each of the multipliers 316, 318, and 320 in group two, and the nine bits on line 372 include the superior three bits on lines 331, 333, and 335 of the six-bit partial products from each of the multipliers 310, 312, and 314 in group one. Adder 352 produces a ten-bit scaled binary number on line 374 that is shifted in significance by three bits or a scaling factor of eight.

A concatenation circuit concatenates the superior three bits on lines 343, 345, and 347 of the six-bit partial products from each of the multipliers 322, 324, and 326 in group three and the inferior three bits on lines 330, 332, and 334 of the six-bit partial products from each of the multipliers 310, 312, and 314 in group one, except that inferior three bits on line 330 bypass the concatenation circuit in one embodiment because these inferior three bits on line 330 are the least significant three bits of the final product on line 306. With this bypass of the inferior three bits on line 330, the concatenation circuit produces the fifteen-bit scaled binary number on line 376 that is shifted in significance by three bits or a scaling factor of eight.

Adder 354 adds the scaled binary numbers on lines 368, 374, and 376. However, the scaled binary numbers on lines 374 and 376 are scaled by a factor eight and the scaled binary number on line 368 is scaled by a factor of sixty-four. Thus, the scaled binary number on line 368 is shifted in significance by three bits relative to the scaled binary numbers on lines 374 and 376. Adder 354 produces a fifteen-bit scaled binary number on line 378 that is concatenated with the least significant three bits from line 330 to form the final product on line 306.

Figure 4:
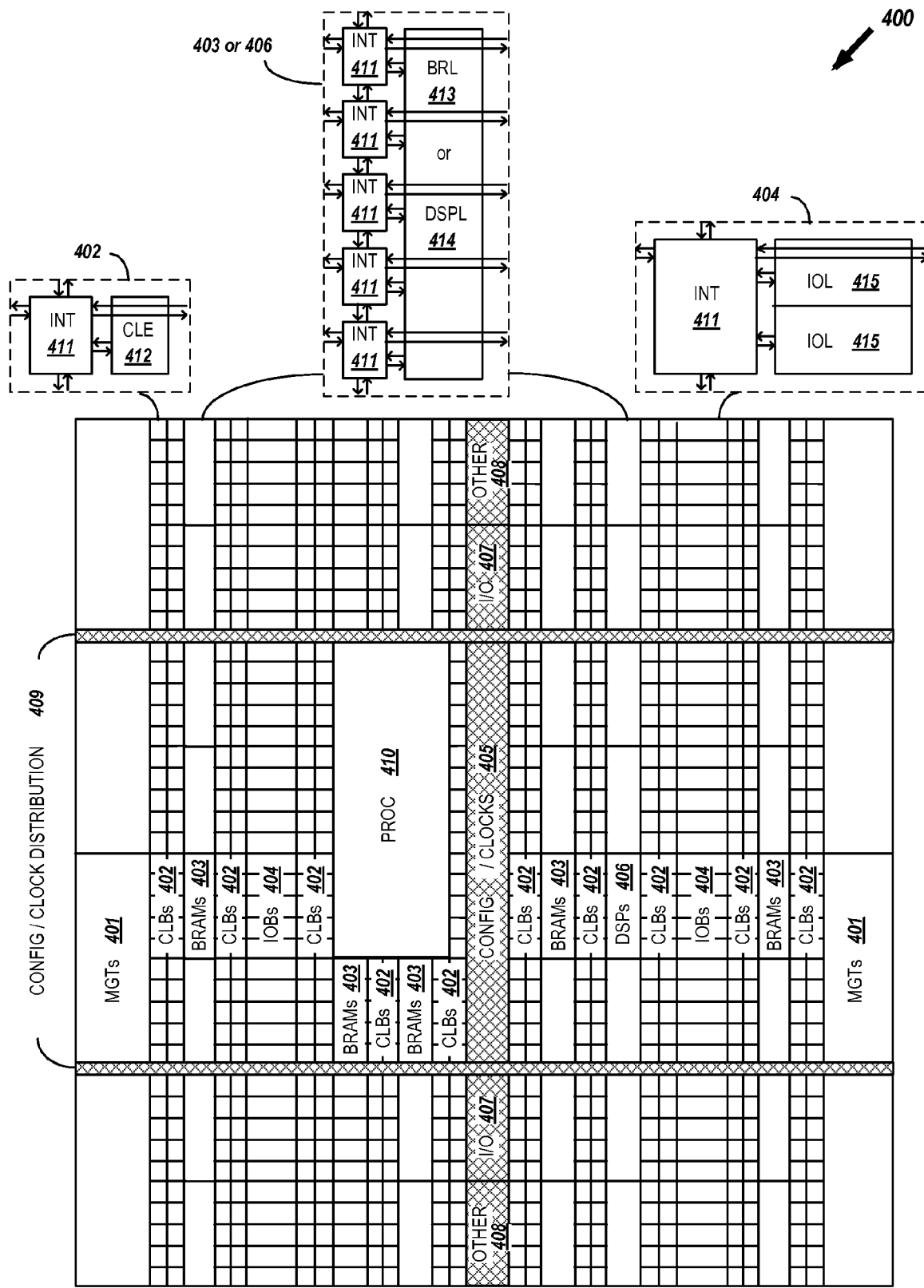
FIG. 4 is a block diagram of a programmable integrated circuit configurable to multiply two numbers in accordance with an embodiment of the invention.

FIG. 4 is a block diagram of a programmable integrated circuit configurable to multiply two numbers in accordance with an embodiment of the invention. The programmable integrated circuit includes programmable logic and interconnect resources that are configured to multiply two signed or unsigned numbers.

Advanced FPGAs can include several different types of programmable logic blocks in the array. For example, FIG. 4 illustrates an FPGA architecture 400 that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407) (e.g., configuration ports and clock ports), and other programmable logic 408 such as digital clock managers, analog-to-digital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element (INT 411) also includes the connections to and from the programmable logic element within the same tile, as shown by the examples included at the top of FIG. 4.

For example, a CLB 402 can include a configurable logic element (CLE 412) that can be programmed to implement user logic plus a single programmable interconnect element (INT 411). A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element (INT 411). As will be clear to those of skill in the art, the actual I/O pads connected, for example, to the I/O logic element 415 typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 5:
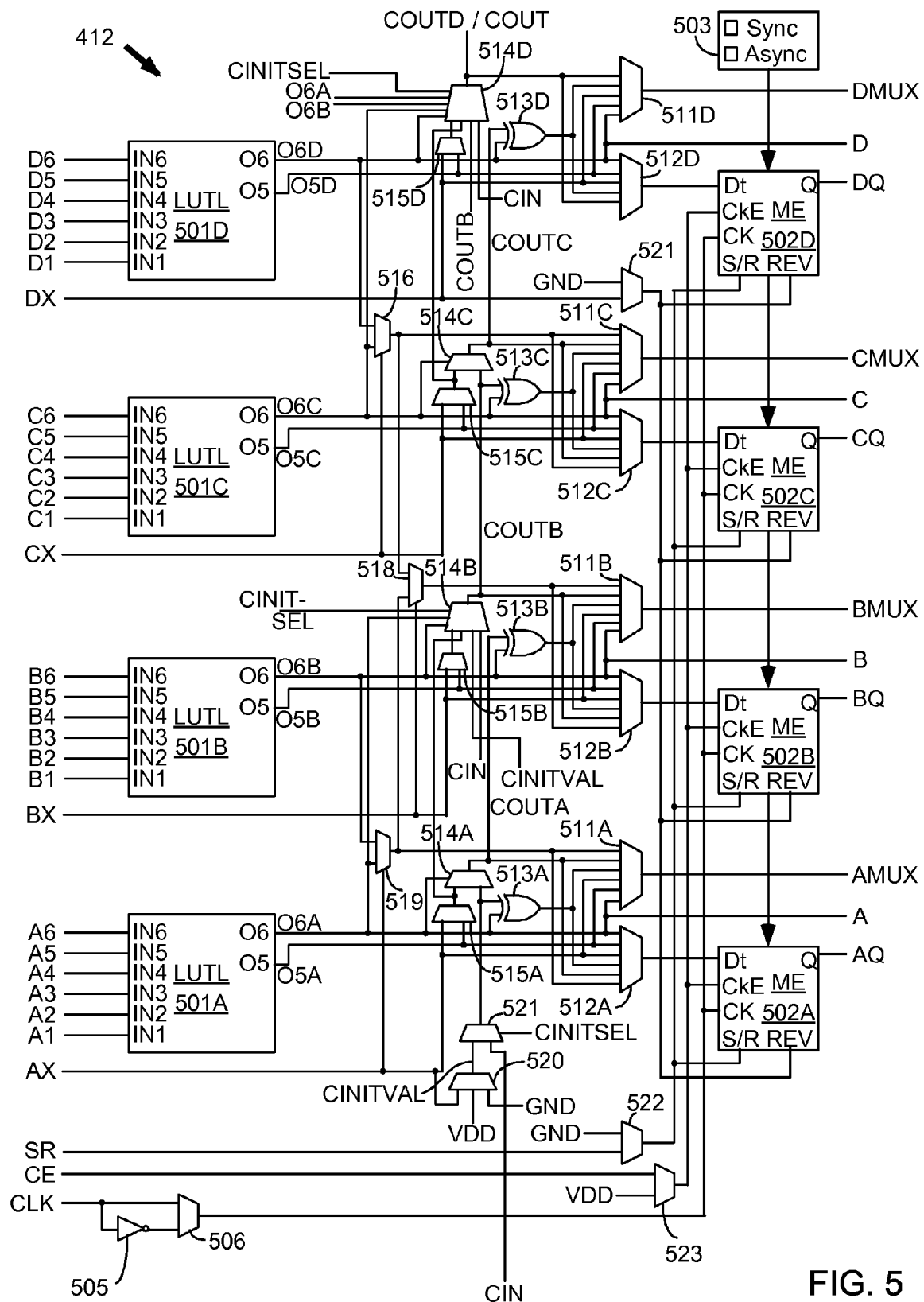
FIG. 5 is a block diagram illustrating one embodiment of a configurable logic element or slice.

FIG. 5 illustrates one embodiment of a configurable logic element or slice 412 that can be used, for example, in the FPGA of FIG. 4. In some embodiments, CLB 402 includes two or more copies of slice 412. In other embodiments, only one copy of slice 412 is included in each CLB. In other embodiments, the CLBs are implemented without using slices or using slices other than those shown in the figures herein.

In the embodiment of FIG. 5, slice 412 includes four lookup tables (LUTLs) 501A-501D, each driven by six LUT data input terminals A1-A6, B1-B6, C1-C6, and D1-D6 and each providing two LUT output signals O5 and O6. (In the present specification, the same reference characters are used to refer to terminals, signal lines, and their corresponding signals.) The O6 output terminals from LUTs 501A-501D drive slice output terminals A-D, respectively. The LUT data input signals are supplied by the FPGA interconnect structure (not shown in FIG. 5) via input multiplexers (not shown in FIG. 5), and the LUT output signals are also supplied to the interconnect structure. Slice 412 also includes: output select multiplexers 511A-511D driving output terminals AMUX-DMUX; multiplexers 512A-512D driving the data input terminals of memory elements 502A-502D; combinational multiplexers 516, 518, and 519; bounce multiplexer circuits 522-523; a circuit represented by inverter 505 and multiplexer 506 (which together provide an optional inversion on the input clock path); and carry logic comprising multiplexers 514A-514D, 515A-515D, 520-521 and exclusive OR gates 513A-513D. All of these elements are coupled together as shown in FIG. 5. Where select inputs are not shown for the multiplexers illustrated in FIG. 5, the select inputs are controlled by configuration memory cells. These configuration memory cells, which are well known, are omitted from FIG. 5 for clarity, as from other selected figures herein.

The lookup tables 501A-501D and the carry logic of multiplexers 514A-514D, 515A-515D, 520-521 and exclusive OR gates 513A-513D are configured to implement a three-input adder adding three four-bit numbers in various embodiments of the invention. It will be appreciated that multiple slices 412 implement three-input adders for more than four bit inputs.

In the pictured embodiment, each memory element 502A-502D can be programmed to function as a synchronous or asynchronous flip-flop or latch. The selection between synchronous and asynchronous functionality is made for all four memory elements in a slice by programming Sync/Asynch selection circuit 503. When a memory element is programmed so that the S/R (set/reset) input signal provides a set function, the REV input terminal provides the reset function. When the memory element is programmed so that the S/R input signal provides a reset function, the REV input terminal provides the set function. Memory elements 502A-502D are clocked by a clock signal CK, e.g., provided by a global clock network or by the interconnect structure. Such programmable memory elements are well known in the art of FPGA design. Each memory element 502A-502D provides a registered output signal AQ-DQ to the interconnect structure.

Each LUT 501A-501D provides two output signals, O5 and O6. The LUT can be configured to function as two 5-input LUTs with five shared input signals (IN1-IN5), or as one 6-input LUT having input signals IN1-IN6. A single LUT can generate the least significant two bits of each six-bit partial product in various embodiments of the invention because these bits are a function of only four bits from the two three-bit digits being multiplied to generate the partial product. Each LUT 501A-501D can be implemented, for example, as shown in FIG. 6.

Figure 6:
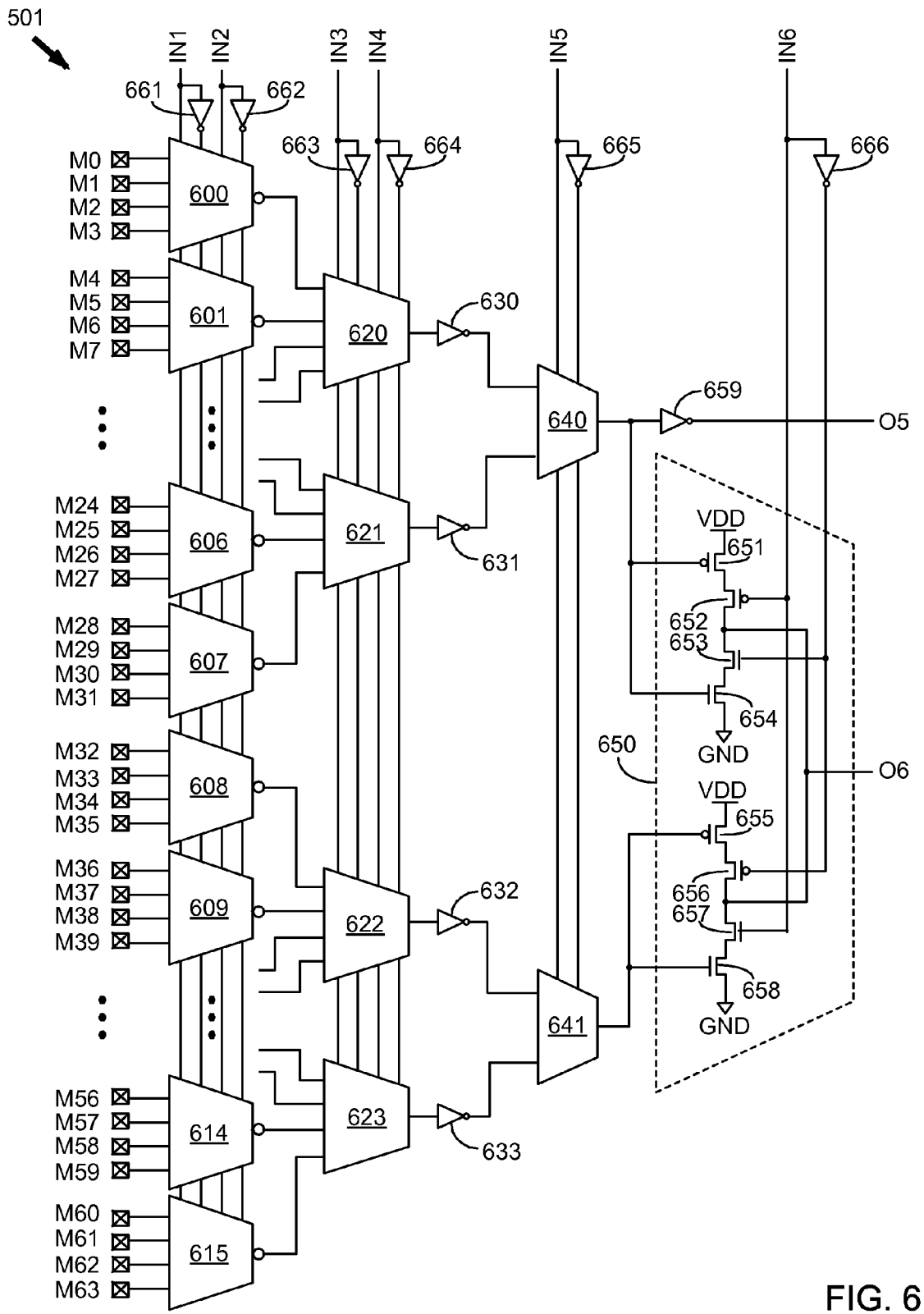
FIG. 6 is a block diagram of a programmable look-up table configurable to generate partial products in accordance with one or more embodiments of the invention.

FIG. 6 is a block diagram of a programmable look-up table configurable to generate partial products in accordance with one or more embodiments of the invention.

In the embodiment of FIG. 6, configuration memory cells M0-M63 drive 4-to-1 multiplexers 600-615, which are controlled by input signals IN1, IN2 and their inverted counterparts (provided by inverters 661, 662) to select 16 of the signals from the configuration memory cells. The selected 16 signals drive four 4-to-1 multiplexers 620-623, which are controlled by input signals IN3, IN4 and their inverted counterparts (provided by inverters 663, 664) to select four of the signals to drive inverters 630-633. Inverters 630-633 drive 2-to-1 multiplexers 640-641, which are controlled by input signal IN5 and its inverted counterpart (provided by inverter 665). The output of multiplexer 640 is inverted by inverter 659 and provides output signal O5. Thus, output signal O5 can provide any function of up to five input signals, IN1-IN5. Inverters can be inserted wherever desired in the multiplexer structure, with an additional inversion being nullified by simply storing inverted data in the configuration memory cells M0-M63. For example, the embodiment of FIG. 6 shows bubbles on the output terminals of multiplexers 600-615, which signifies an inversion (e.g., an inverter) on the output of each of these multiplexers.

Multiplexers 640 and 641 both drive data input terminals of multiplexer 650, which is controlled by input signal IN6 and its inverted counterpart (provided by inverter 666) to select either of the two signals from multiplexers 640-641 to drive output terminal O6. Thus, output signal O6 can either provide any function of up to five input signals IN1-IN5 (when multiplexer 650 selects the output of multiplexer 641, i.e., when signal IN6 is high), or any function of up to six input signals IN1-IN6.

In the pictured embodiment, multiplexer 650 is implemented as two three-state buffers, where one buffer is driving and the other buffer is disabled at all times. The first buffer includes transistors 651-654, and the second buffer includes transistors 655-658, coupled together as shown in FIG. 6.

The present invention is thought to be applicable to a variety of circuits for multiplying two numbers. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit structure for multiplying a first number by a second number, each having a plurality of three-bit digits, the circuit structure comprising:
   a plurality of multipliers for pairs of the three-bit digits of the first number and the three-bit digits of the second number;
   wherein the multipliers produces a plurality of six-bit partial products, each multiplier producing the six-bit partial product from the pair of three-bit digits of the first and second numbers;
   wherein each multiplier includes a plurality of look-up tables, wherein a six-bit input of each of the look-up tables receives the pair of three-bit digits of the first and second numbers for the multiplier, and a one-bit output of each of the look-up tables of the multiplier produces a bit of the six-bit partial product for the multiplier; and
   a summing-tree circuit coupled to the multipliers, the summing-tree circuit including a plurality of adders arranged in a series of levels, the adders in an initial one of the levels producing a plurality of partial sums from the six-bit partial products from the multipliers,
   wherein for each first and successive second ones of the levels in the series, the adders in the second level produce another plurality of partial sums from the partial sums from the first level, a last one of the levels including one of the adders that produces a final product of the first and second numbers.

2. The circuit structure of claim 1, wherein, for each level of the summing-tree circuit other than the last level, each adder in the level produces only one of the partial sums and the partial sum is a scaled binary number.

3. The circuit structure of claim 2, wherein:
   a majority of the adders in the levels of the summing-tree circuit add exactly three scaled binary numbers and the adders not in the majority add exactly two scaled binary numbers,
   the adders in the initial level add the scaled binary numbers that are the six-bit partial products from the multipliers and a correction value, the correction value correcting the final product for a two's complement representation of the first and second numbers and the final product, and
   for each first and successive second ones of the levels in the series, the adders in the second level add the scaled binary numbers that are the partial sums from the first level.

4. The circuit structure of claim 3, wherein:
   the summing-tree circuit further includes a plurality of respective registers for the levels of the summing-tree circuit,
   the respective register for the initial level couples the multipliers and a correction circuit to the initial level,
   the respective register for the initial level stores the six-bit partial products from the multipliers and the correction value from the correction circuit,
   the respective register for the initial level provides the six-bit partial products and the correction value to the adders in the initial level, and
   for each first and successive second ones of the levels in the series, the respective register for the second level couples the first and second levels, the respective register storing the partial sums from the first level and providing the partial sums to the adders in the second level.

5. The circuit structure of claim 1, wherein:
   each adder in the initial level adds a most significant three bits of each of the six-bit partial products in a first group and a least significant three bits of each of the six-bit partial products in a second group,
   the first and second groups respectively correspond to a first and next more significant second one of the three-bit digits of the second number,
   the first group includes the six-bit partial products for the pairs of each of the three-bit digits of the first number and the first three-bit digit of the second number, and
   the second group includes the six-bit partial products for the pairs of each of the three-bit digits of the first number and the second three-bit digit of the second number.

6. The circuit structure of claim 1, wherein:
   the initial level of the summing-tree circuit includes at least one concatenation circuit providing a partial result concatenating a least significant three bits of each six-bit partial product in a first group and a most significant three bits of each six-bit partial product in a second group,
   the first and second groups respectively correspond to first and second ones of the three-bit digits of the second number,
   the first group includes the six-bit partial products for the pairs of each of the three-bit digits of the first number and the first three-bit digit of the second number,
   the second group includes the six-bit partial products for the pairs of each of the three-bit digits of the first number and the second three-bit digit of the second number, the least significant three bits of each six-bit partial product in a first group not overlapping in significance with the most significant three bits of each six-bit partial product in a second group, and
   the initial level produces the partial sums that include the partial result from the at least one concatenation circuit.

7. The circuit structure of claim 1, wherein a least significant three bits of the final product is a least significant three bits of the six-bit partial product from the multiplier for the pair of a least significant one of the three-bit digits of the first number and a least significant one of the three-bit digits of the second number.

8. A circuit structure for multiplying a first nine-bit number by a second nine-bit number, each having three three-bit digits, the circuit structure comprising:
  nine multipliers for pairs of the three-bit digits of the first nine-bit number and the three-bit digits of the second nine-bit number;
  wherein the multipliers produce a plurality of six-bit partial products, each multiplier producing the six-bit partial product from the pair of three-bit digits of the first and second nine-bit numbers;
  wherein each multiplier includes a plurality of look-up tables, a six-bit input of each of the look-up tables receiving the pair of the three-bit digits of the first and second nine-bit numbers for the multiplier, and a one-bit output of each of the look-up tables of the multiplier providing a bit of the six-bit partial product for the multiplier,
  wherein for a first, second, and third group respectively corresponding to a low, middle, and high one of the three three-bit digits of the second nine-bit number, each of the groups includes the six-bit partial products for the pairs of each of the three three-bit digits of the first nine-bit number and the corresponding three-bit digit of the second nine-bit number;
  a concatenation circuit coupled to the multipliers in the first and third groups, the concatenation circuit providing a partial result concatenating an inferior three-bit digit of each six-bit partial product in first group and a superior three-bit digit of each six-bit partial product in the third group;
  first and second adders coupled to the multipliers;
  wherein the first adder provides a first partial sum of a superior three-bit digit of each six-bit partial product in the first group and an inferior three-bit digit of each six-bit partial product in the second group;
  wherein the second adder provides a second partial sum of a superior three-bit digit of each six-bit partial product in the second group and an inferior three-bit digit of each six-bit partial product in the third group; and
  a third adder coupled to the concatenation circuit and the first and second adders, the third adders providing a final product adding the partial result and the first and second partial sums.

9. The circuit structure of claim 8, wherein the third adder provides the final product adding the partial result and a respective scaling of the first and second partial sums, the respective scaling of the first partial sum being a factor of eight and the respective scaling of the second partial sum being a factor of sixty-four.

10. The circuit structure of claim 8, further comprising a first and second register, wherein:
  the first register couples the nine multipliers to the concatenation circuit and the first and second adders,
  the first register stores the six-bit partial products from the nine multipliers and provides the six-bit partial products to the concatenation circuit and the first and second adders, and
  the second register couples the concatenation circuit and the first and second adders to the third adder, the second register storing the partial result and the first and second partial sums and providing the partial result and the first and second partial sums to the third adder.

11. The circuit structure of claim 8, wherein:
  the multiplier for each pair includes six look-up tables for producing the six-bit partial product for the multiplier,
  a one-bit output of each of the six look-up tables provides a respective bit of the six-bit partial product,
  an at least two-bit input of the look-up table for a least significant bit of the six-bit partial product receives the least significant bit of each of the pair of the three-bit digits of the first and second nine-bit numbers,
  an at least four-bit input of the look-up table for a next more significant bit of the six-bit partial product receives the least significant two bits of each of the pair of the three-bit digits of the first and second nine-bit numbers, and
  a six-bit input of each of the look-up tables for a four most significant bits of the six-bit partial product receives the pair of the three-bit digits of the first and second nine-bit numbers.

12. The circuit structure of claim 8, wherein the final product and the first and second nine-bit numbers have an unsigned binary representation.

13. The circuit structure of claim 8, wherein the first nine-bit number has an unsigned binary representation, and the final product and the second nine-bit number have a two's complement representation.

14. The circuit structure of claim 8, wherein the final product and the first and second nine-bit numbers have a two's complement representation.

15. The circuit structure of claim 14, further comprising first and second correction circuits, wherein:
  the first correction circuit converts the two's complement representation of the first and second nine-bit numbers into a respective signs and a respective unsigned binary representations, and
  the second correction circuit converts the final product and the respective signs into the two's complement representation of the final product.

16. The circuit structure of claim 14, further comprising a correction circuit for generating a correction value that compensates for the two's complement representation,
  wherein the correction circuit respectively generates the correction value of zero, the first nine-bit number, the second nine-bit number, and a sum of the first and second nine-bit numbers in response to the both the first and second nine-bit numbers being positive, the first nine-bit number being positive and the second nine-bit number being negative, the first nine-bit number being negative and the second nine-bit number being positive, and both the first and second nine-bit numbers being negative.

17. The circuit structure of claim 16, wherein:
  the correction circuit includes an adder and first and second multiplexers coupled to the adder,
  the first multiplexer generates a first partial correction value of zero and the first nine-bit number in response to the second nine-bit number respectively being positive and negative,
  the second multiplexer respectively generates a second partial correction value of zero and the second nine-bit number in response to the first nine-bit number respectively being positive and negative, and
  the adder generates the correction value by adding the first partial correction value and the second partial correction value.

18. The circuit structure of claim 16, wherein:
  the correction circuit is coupled to the second adder, and
  the second adder provides the second partial sum of a nine-bit shift of the correction value, the superior three-bit digit of each six-bit partial product in the second group, and the inferior three-bit digit of each six-bit partial product in the third group.

19. The circuit structure of claim 8, wherein:
- a programmable integrated circuit includes an array of programmable logic and interconnect resources,
- the look-up tables of the nine multipliers are the look-up tables of a plurality of configurable logic blocks of the programmable logic resources, and
- the first, second, and third adders are a plurality of adders of the configurable logic blocks of the programmable logic resources.

20. A circuit structure for multiplying a first nine-bit number and a second nine-bit number, each having three three-bit digits, the circuit structure comprising:
- nine multipliers for pairs of the three-bit digits of the first nine-bit number and the three-bit digits of the second nine-bit number;
- wherein the multipliers produce a plurality of six-bit partial products, each multiplier producing the six-bit partial product from the pair of three-bit digits of the first and second nine-bit numbers;
- wherein each multiplier includes a plurality of look-up tables, a six-bit input of each of the look-up tables receiving the pair of the three-bit digits of the first and second nine-bit numbers for the multiplier, and a one-bit output of each of the look-up tables of the multiplier providing a bit of the six-bit partial product for the multiplier;
- wherein for a first, second, and third group respectively corresponding to a low, middle, and high one of the three three-bit digits of the second nine-bit number, each of the groups includes the six-bit partial products for the pairs of each of the three three-bit digits of the first nine-bit number and the corresponding three-bit digit of the second nine-bit number;
- a concatenation circuit coupled to the multipliers in the first and third groups;
- wherein the concatenation circuit provides a partial result concatenating an inferior three-bit digit of each six-bit partial product in first group and a superior three-bit digit of each six-bit partial product in the third group;
- a first adder coupled to the multipliers in the second and third groups;
- wherein the first adder provides a partial sum of an inferior three-bit digit of each six-bit partial product in the second group, a superior three-bit digit of each six-bit partial product in the second group, and an inferior three-bit digit of each six-bit partial product in the third group; and
- a second adder coupled to the multipliers in the first group, the concatenation circuit, and the first adder,
- wherein the second adder provides a final product adding a superior three-bit digit of each six-bit partial product in the first group, the partial result, and the partial sum.

* * * * *